(No Model.) 2 Sheets—Sheet 1.
C. HALLER.
FOLDING BABY CARRIAGE.
No. 357,382. Patented Feb. 8, 1887.
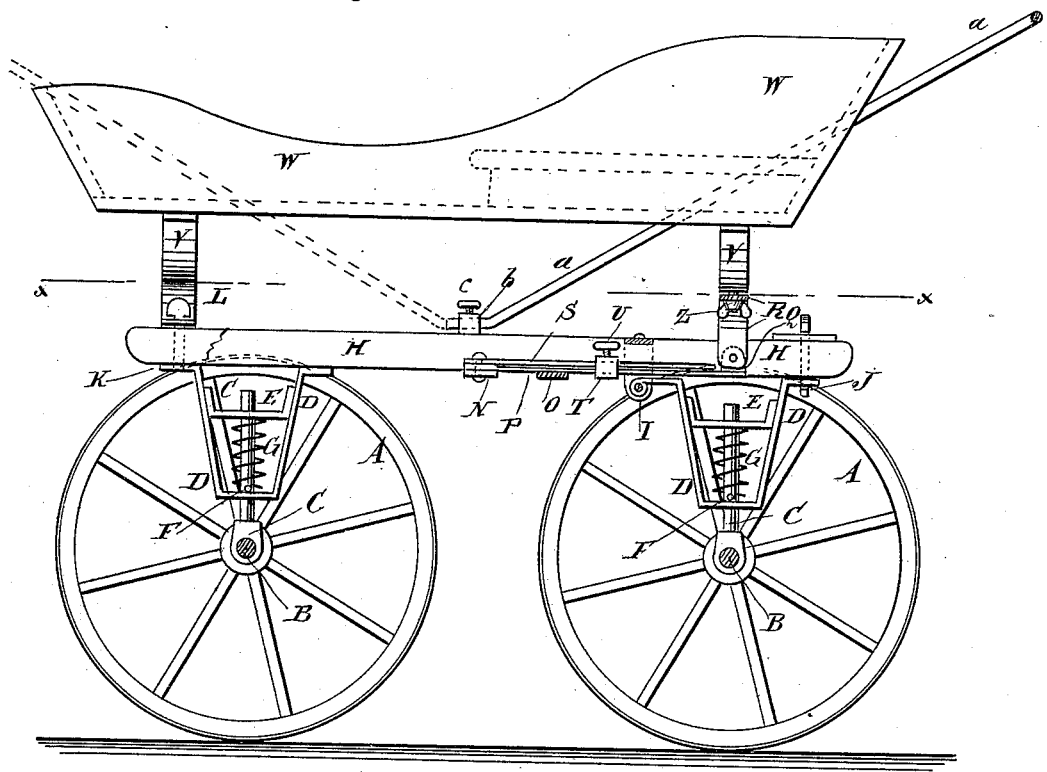
Fig: 1.
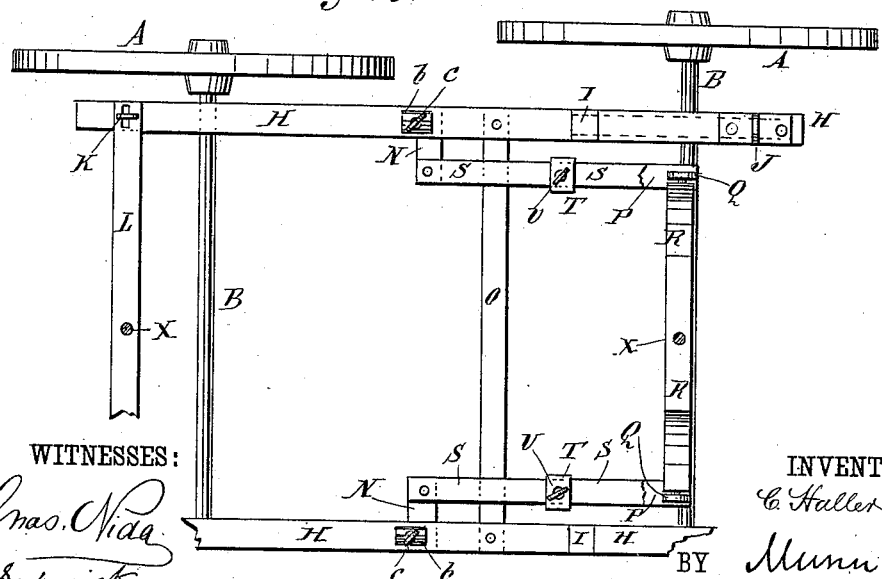
Fig: 2.
WITNESSES:
Chas. Nida
C. Sedgwick
INVENTOR:
C. Haller
BY Munn & Co
ATTORNEYS.

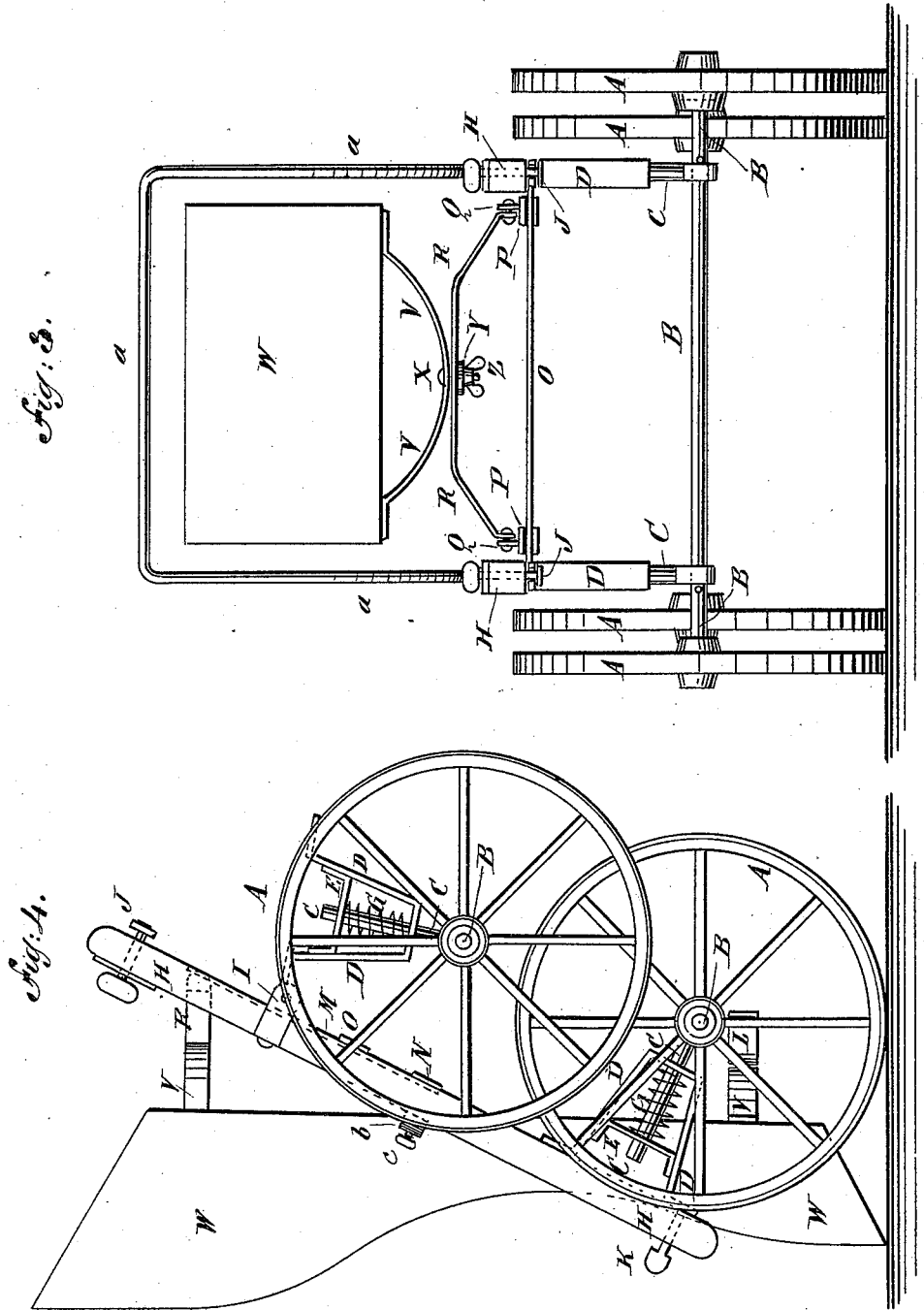

United States Patent Office.

CHARLES HALLER, OF NEW YORK, N. Y.

FOLDING BABY-CARRIAGE.

SPECIFICATION forming part of Letters Patent No. 357,382, dated February 8, 1887.

Application filed June 28, 1886. Serial No. 206,473. (No model.)

*To all whom it may concern:*

Be it known that I, CHARLES HALLER, of the city, county, and State of New York, have invented a new and useful Improvement in Folding Baby-Carriages, of which the following is a full, clear, and exact description.

Reference is to be had to the accompanying drawings, forming a part of this specification, in which similar letters of reference indicate corresponding parts in all the figures.

Figure 1 is a sectional side elevation of my folding baby-carriage. Fig. 2 is a sectional plan view of the same, taken through the line $x\ x$, Fig. 1, parts being broken away. Fig. 3 is a rear elevation of the same. Fig. 4 is a side elevation of the same folded.

The object of this invention is to improve the construction of the baby-carriages for which Letters Patent No. 340,779 were granted to me April 27, 1886, in such a manner as to make them simpler in construction and more convenient in use.

The invention consists in the construction and combination of various parts of the baby-carriage, as will be hereinafter fully described.

A are the wheels of the baby-carriage, to the axles B of which are attached standards C. The standards C pass up through guide-holes in the bends of the U-shaped brackets D and in the braces E, attached to and connecting the arms of the said brackets. The upward movement of the brackets D upon the standards C is limited by pins F, passing through the said standards above the bends of the said brackets. The weight of the brackets D and of the carriage side bars and their attachments is supported by springs G, placed upon the standards C. The lower ends of the springs G rest upon the pins F, and upon the upper ends of the said springs rest the braces E of the brackets D.

The upper ends of the forward brackets D are bent outward, and are secured by bolts, screws, rivets, or other suitable means to the side bars, H. The upper ends of the rear brackets are bent outward, and the forward upper ends of the said rear brackets are hinged to lugs I, attached to the side bars, H. The rear upper ends of the rear brackets D are slotted to receive the stems of the buttons J, which stems pass up through the side bars, H, and have knobs or other handles attached to their upper ends, so that the rear upper ends of the said brackets can be secured to the side bars, H, by passing the buttons J through the slots in the said ends, and then turning the said buttons through a quarter of a revolution.

The rear axle is made a little longer than the forward axle, so that when the rear ends of the rear brackets D are released, and the rear ends of the side bars, H, are raised, the rear wheels, rear axle, and rear brackets will swing downward and forward, and the rear wheels will overlap the forward wheels, as shown in Fig. 4, and the running-gear of the carriage will be compactly folded.

To the forward ends of the side bars, H, are pivoted buttons K, which engage with the slotted ends of the arched bar L, so as to secure the said ends detachably to the side bars, H.

To the lower sides of the side bars, H, are attached plates M, which have short inwardly-projecting arms N at or near their forward ends, and at about the centers of the said side bars, H. To the plates M and the side bars, H, a little in the rear of the arms N, are attached the ends of a cross-bar, O. To the ends of the arms N are attached the forward ends of springs P, which rest upon the bar O, and to their rear ends are attached lugs Q, to which are pivoted the downwardly-bent ends of the arched bar R.

The springs P are provided with one or more supplementary leaves, S, the rear ends of which are at a little distance from the lugs Q.

Around the springs P S are passed sliding bands T, which are secured in place adjustably by set-screws U, passing through the upper parts of the said bands T and resting against the leaves S. With this construction, when the child is small, the bands T are moved forward close to the cross-bar O, so that only the elasticity of the springs P will be used. As the child increases in size and weight the bands T are moved back, so as to utilize so much of the elasticy of the supplementary leaves S as the weight of the child may require.

The middle parts of the arched bars L R are made straight and horizontal, and upon them rest the rockers V, the ends of which are attached to the bottom of the carriage-body W. The centers of the rockers V and arched bars L R are perforated to receive the bolts X, which have washers Y and hand-nuts Z upon their lower ends. With this construction, when the nuts Z are screwed up tight, the rockers V are rigidly connected with the arched bars L R, and serve simply as supports to the carriage-body. When the nuts Z are turned down, the rockers V are released and can rock upon the straight horizontal parts of the bars L R, so that the carriage can be used as a cradle, the bolts and nuts X Z limiting the swing of the carriage-body and keeping the rockers V in place upon the bars L R.

*a* is the handle, which is made in U shape, and the ends of its arms are bent forward at such an angle as will give a proper inclination to the handle. The ends of the arms of the handle *a* are inserted in sockets *b*, secured to the middle parts of the side bars, H, and are secured in the said sockets by hand-screws *c*, passing through the sides of the sockets and resting against the said arms. With this construction the handle *a* can be readily detached, and can be reversed so that it can be used as a push-handle, as shown in full lines in Fig. 1, or as a pull-handle, as indicated in dotted lines in the said figure.

By releasing the ends of the front arched bar, L, the forward end of the carriage-body W can be swung down between the forward ends of the side bars, H, and by releasing the rear ends of the rear brackets D, and raising the rear ends of the side bars, H, the rear wheels, A, and the rear brackets D can be swung downward and forward, so that the said rear wheels will overlap the forward wheels, and the carriage will be compactly folded, and can be readily taken into a house or up a stairway, and will occupy a comparatively small space when stored.

Having thus described my invention, what I claim as new, and desire to secure by Letters Patent, is—

1. In a baby-carriage, the combination, with the side bars, H, and the arched bar R, supporting the rear end of the carriage-body, of the plate M, having arms N, and attached to the said side bars, the cross-bar O, attached to the said plates and side bars, and the springs P, attached to the said arms, resting upon the said cross-bar and connected with the said arched bar, substantially as herein shown and described, whereby an elastic support is provided for the rear end of the carriage-body, as set forth.

2. In a baby-carriage, the combination, with the springs P, of the supplementary leaves S, the adjustable bands T and their set-screws U, substantially as herein shown and described, whereby the elasticity of the said spring can be regulated, as set forth.

3. In a baby-carriage, the combination, with the arched supporting-bars L R, having horizontal middle parts, and the carriage-body W, of the rockers V and the bolts and nuts X Z, connecting the said bars and rockers, substantially as herein shown and described, whereby the carriage can be used as a cradle, as set forth.

4. In a baby-carriage, the combination, with the side bars, H, and the pivoted rear arched bar R, of the front arched bar L, having its ends detachably secured to the said side bars, substantially as herein shown and described.

CHARLES HALLER.

Witnesses:
JAMES T. GRAHAM,
EDGAR TATE.